US007929617B2

(12) United States Patent
Green

(10) Patent No.: US 7,929,617 B2
(45) Date of Patent: Apr. 19, 2011

(54) METHOD AND APPARATUS TO GENERATE A CONTINUOUS PHASE MODULATION WAVEFORM THAT IS SYMMETRIC AND PERIODIC

(75) Inventor: Marilynn P. Green, Pomona, NY (US)

(73) Assignee: Nokia Corporation, Espoo (FI)

( * ) Notice: Subject to any disclaimer, the term of this patent is extended or adjusted under 35 U.S.C. 154(b) by 1043 days.

(21) Appl. No.: 11/407,869

(22) Filed: Apr. 18, 2006

(65) Prior Publication Data

US 2007/0258512 A1    Nov. 8, 2007

(51) Int. Cl.
*H04L 27/00*    (2006.01)
(52) U.S. Cl. .................................. 375/259; 375/150
(58) Field of Classification Search .................. 375/259, 375/150
See application file for complete search history.

(56) References Cited

U.S. PATENT DOCUMENTS

| 7,430,257 | B1 * | 9/2008 | Shattil | 375/347 |
| 2004/0141548 | A1 * | 7/2004 | Shattil | 375/146 |

OTHER PUBLICATIONS

Al-Dhahir, N: "A new multicarrier transceiver based on the discrete cosine transform," Wireless Communications and Networking Conference,. 2005 IEEE,. vol. 1, p. 45-50 vol. 1, Mar. 13-17, 2005. Title; section III-B; remark 1 on p. 49.

Mandyam, G.D: "Sinusoidal transforms in OFDM systems," Broadcasting, IEEE Transactions on, vol. 50, No. 2, p. 172-184, Jun. 2004, Introduction.

Jun Tan et al: "Constant envelope multi-carrier modulation," MILCOM 2002. Proceedings, vol. 1, p. 607-611 vol. 1, Oct. 7-10, 2002. abstract.

Pancaldi, F et al: "Equalization algorithms in the frequency domain for continuous phase modulations," Global Telecommunications Conference, 2005. GLOVECOM '05. IEEE, vol. 3, p. 6-28c. Abstract.

Sinusoidal Transforms in OFDM Systems, Giridhar D. Mandyam, IEEE Transactions on Broadcasting, vol. 50, No. 2, Jun. 2004—pp. 172-184.

* cited by examiner

*Primary Examiner* — David C Payne
*Assistant Examiner* — Nader Bolourchi

(57) ABSTRACT

A technique is provided to generate a sequence of symbols to be transmitted, comprising transmitting a block of symbols having data and redundancy symbols, the redundancy symbols generated based on the data symbols, a first part of the redundancy symbols transmitted as a prefix of the block, a second part of the redundancy symbols transmitted as a postfix of the block and a third part of the redundancy symbols transmitted as an intermediate part of the block between the prefix part and postfix part. The first part may be generated from the symbols transmitted at the end of a data portion of the block, the second part may be generated from the symbols transmitted at the start of the data portion of the block, the third part may be generated from an entire sequence of nonredundant data symbols transmitted in the first half of the data portion of the block.

61 Claims, 11 Drawing Sheets

Special construction of the transmission block to force symmetric-periodicity.

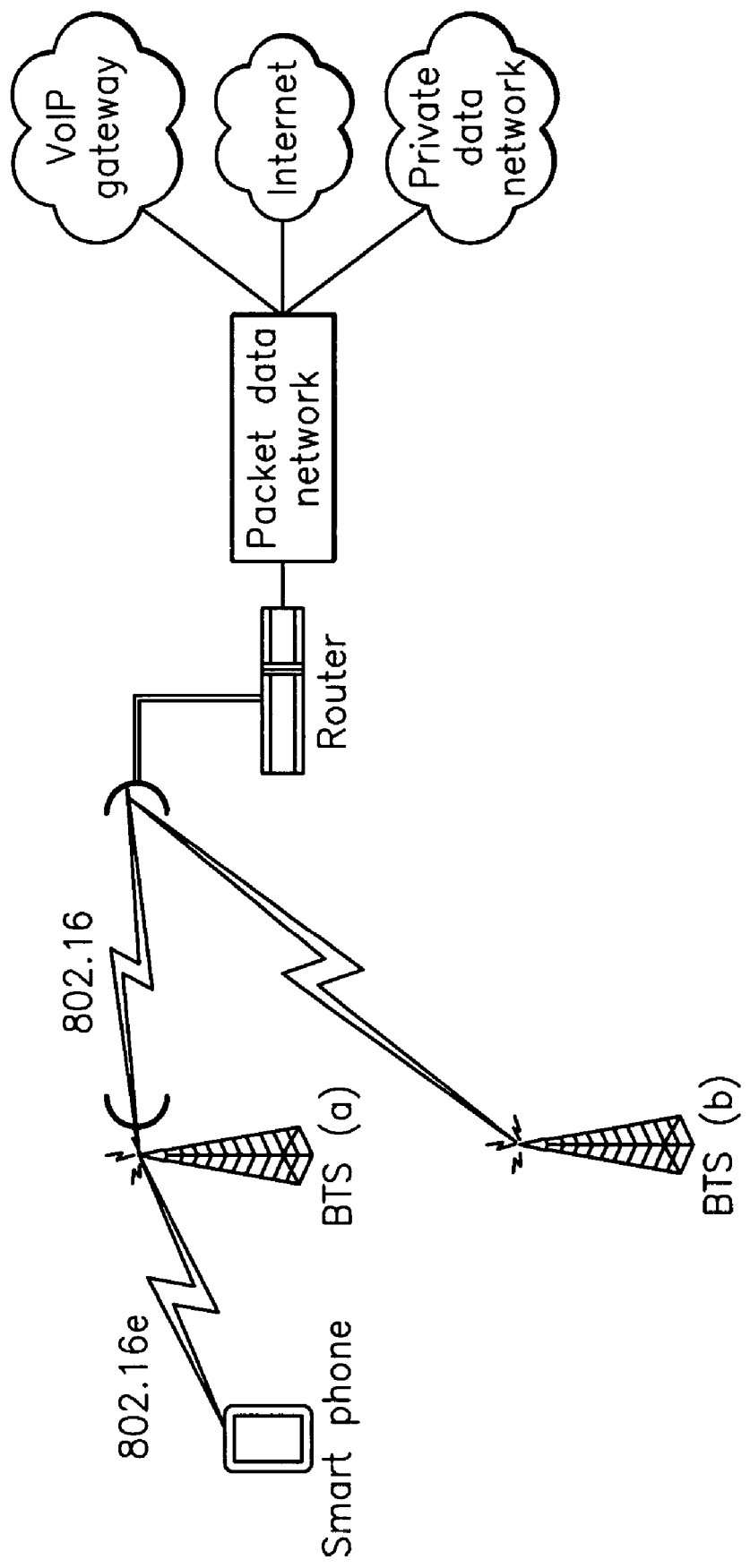
FIG. 10: 802.16e simple campus configuration.

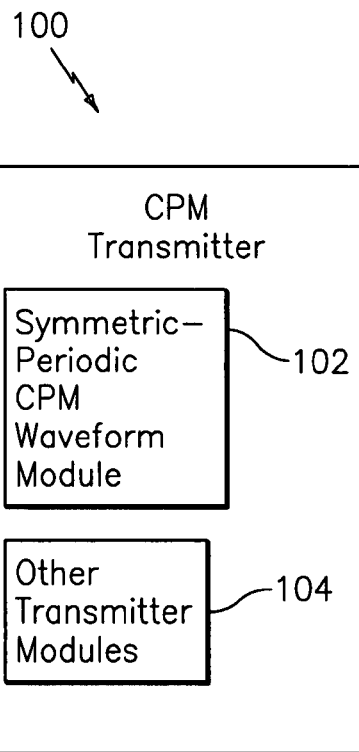
FIG. 11a: The CPM Transmitter
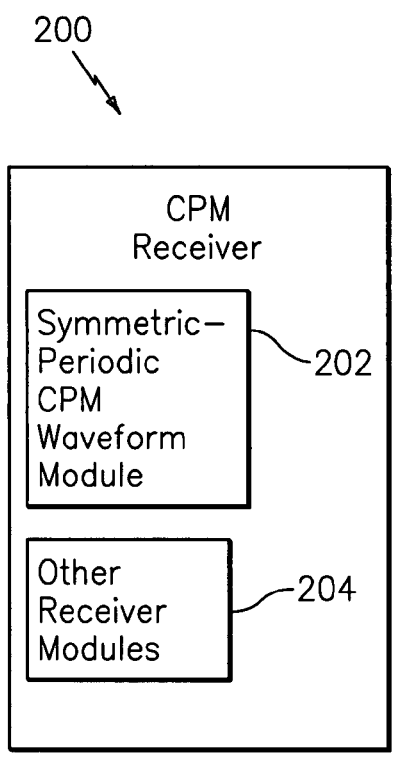
FIG. 11b: The CPM Receiver

METHOD AND APPARATUS TO GENERATE A CONTINUOUS PHASE MODULATION WAVEFORM THAT IS SYMMETRIC AND PERIODIC

BACKGROUND OF THE INVENTION

1. Field of Invention

The present invention is related to a method and apparatus for generating a symmetric-periodic Continuous Phase Modulation (CPM) signal; and more particularly, is related to a method and apparatus for generating a symmetric-periodic CPM signal in a high speed wireless packet network such as that set forth in the IEEE 802.16e Standard for wireless Metropolitan Area Network (MAN) technology.

2. Description of Related Art

Orthogonal Frequency Division Multiplexing (OFDM) transmission schemes are well known in the art for transmitting data in broadband multi-user communications systems and network, as well as other known systems and networks, and was first introduced as a means of counteracting channel-induced linear distortions encountered when transmitting over a dispersive radio channel. See L. Hanzo, et al., "OFDM and MC-CDMA for Broadband Multi-User Communications, WLANs and Broadcasting," J. Wiley & Sons, Ltd., 2004; as well as A. Bahai et al., "Multi-Carrier Digital Communications Theory and Applications of OFDM", 2nd Ed., Springer Science and Business, Inc. 2004.

For such OFDM transmission schemes, inter-symbol interference (ISI) and inter-carrier interference (ICI) can be removed at the receiver by adding a cyclic guard interval and a cyclic prefix to the time-domain transmitted signal. This is accomplished by pre-pending a certain number of the ending data vector to the beginning of the OFDM symbol (or, equivalently, by appending a certain number of the beginning data vector to the end of the OFDM symbol). If the guard interval is longer in duration than the channel's impulse response, then each sub-carrier will appear to have passed through a flat fading channel. Consequently, the receiver can exploit the cyclic shift properties of the Discrete Fourier Transform (DFT) to significantly reduce the complexity of frequency domain equalization (FDE) techniques.

For example, FIG. 1A shows blocks of data 6, 8 having cyclic extensions 10, 12 postfixed thereon in relation to corresponding blocks of data 13, 15 having cyclic extensions 14, 16 prefixed thereon. When transmitted, each block of data is linearly convolved with the channel. By adding the cyclic extension (prefix or postfix) to each block, one can make the linear convolution between the block and the channel appear to be a circular convolution if the length of the guard interval exceeds the impulse response length of the channel. In the frequency domain, one can implement a single-tap channel equalizer at each frequency. This technique is well known for OFDM-based communications networks and systems and, more recently, for single-carrier systems. It has only recently been considered for CPM-based applications. In FIG. 1A, there is a window (L . . . G) over which the FFT window may start. As long an Nk-point FFT is taken (N data symbols/block and k samples/symbol), one can obtain an equivalent receiver output.

Moreover, DFT-based SC-FDE (Single-Carrier FDE) techniques have only recently been applied to Continuous Phase Modulation (CPM) systems. For the purpose of understanding the invention that is discussed herein, CPM is summarized and characterized as follows: Over the nth symbol interval, a binary single-h CPM waveform can be expressed as $$s(t, a, h) = \exp\left\{j2\pi h \sum_{i=-\infty}^{n} I_i q(t - iT)\right\}, nT \leq t < (n+1)T, \quad (1)$$

where T denotes the symbol duration, $I_i \in \{\pm 1\}$ are the binary data bits and h is the modulation index. The phase function, q(t), is the integral of the frequency function, f(t), which is zero outside of the time interval (0,LT) and which is scaled such that $$\int_0^{LT} f(\tau) d\tau = q(LT) = \frac{1}{2}. \quad (2)$$

An M-ary single-h CPM waveform is the logical extension of the binary single-h case in which the information symbols are now multi-level: i.e., $I_i \in \{\pm 1, \pm 3, \ldots, \pm(M-1)\}$. Usually, M is selected to be an even number. However, it is noted that other alphabets are possible (and can also be used with this invention). For example, M can be odd or the alphabet can include zero—i.e. $I_i \in \{0, \pm 1, \pm 3, \ldots, \pm(M-1)\}$. The only restriction in this invention is that the alphabet contains an element and its antipodal counterpart. Finally, an M-ary multi-h CPM waveform can be written as $$s(t, I, h) = \exp\left\{j2\pi \sum_{i=-\infty}^{n} I_i h_{(i)_J} q(t - iT)\right\}, nT \leq t < (n+1)T. \quad (3)$$

Typically, $I_i \in \{\pm 1, \pm 3, \ldots, \pm(M-1)\}$ (M even). However, there is no restriction to this particular alphabet and M can even be odd, as mentioned earlier. Typically, the modulation index cycles through a set of J values: $h \in \{h_0 \wedge h_{J-1}\}$ and so $(i)_J$ denotes "i modulus J". The expression in (3) may also be written as:

$$s(t, a, h) = \exp\left\{j\left(\theta_{n-L} + 2\pi \sum_{i=0}^{L-1} I_{n-i} h_{(n-i)_J} q(t - (n-i)T)\right)\right\} \quad (4)$$

The phase state, $$\theta_{n-L} = \pi \sum_{i=-\infty}^{n-L} I_i h_{(i)_J}$$

mod $2\pi$ determines the contribution of the symbols for which the phase function has reached its final constant value of one half.

However, when applying such DFT-based SC-FDE techniques to CPM systems, some issues have developed. Since the CPM waveform signal is supposed to have a continuous phase, one cannot simply append a cyclic extension at the end or beginning of a data block. FIG. 1B shows an example of a blind introduction of a cyclic extension, which can destroy the continuous phase property of the CPM waveform signal. If the cyclic postfix portion of the waveform is appended to a CPM waveform, the phase would become discontinuous, which results in expansion of the signal bandwidth and a reduction in spectral efficiency. In effect, when pre-pending or appending the cyclic extension to the CPM waveform, care must be taken in order to maintain phase continuity.

One approach for appending a cyclic extension to CPM block transmissions is to insert special data-dependent symbols ("channel" or "tail" symbols) into the data portion of the CPM transmission block. The inclusion of these special symbols allows the transmitter to repeat the data in a cyclic extension without destroying the continuous phase property of the signal. However, these "channel" symbols, which are calculated based on past observations, must either be computed on a block-by-block basis or determined by using a table-lookup in order to map a particular sequence of observed symbols to the required "channel" symbol sequence. In addition, since they are data-dependent, the actual number of "channel" bits that are needed may vary from block to block. Simple approaches exist for constructing the "tail" bits for binary single-h CPM systems, but no one has provided a general, low complexity solution for M-ary multi-h CPM.

Recently, DTT-based (Discrete Trigonometric Transform) SC-FDE techniques have been applied to OFDM as an alternative to DFT-based FDE schemes. See Giri Mandyam, "Sinusoidal Transforms in OFDM Systems", IEEE Transactions in Broadcasting, Vol. 50, No. 2, June 2004, pp. 172-184. DTT includes the family of Discrete Sine Transforms (DSTs) and Discrete Cosine Transforms (DCTs). Just as DFT-based system exploit the cyclic convolution property of the DFT in order to simplify receiver design, DTT-based systems can exploit the symmetric-convolution property of the DTT in order to develop low complexity FDE techniques.

The symmetric convolution property of the DTT can be summarized as follows: the cyclic convolution of two symmetrically extended finite sequences in the time domain is equivalent to the multiplication of their cosine/sine series coefficients in the frequency domain. Thus, in order to use DTT-based receiver methods, a transmitter can create a signal that has symmetry/anti-symmetry about a distinct point in time, and which repeats in a cyclic prefix/postfix. When passed through the radio channel, it will appear to have passed through a flat fading channel and consequently the receiver can exploit the symmetric-convolution properties of the DTT to significantly reduce the complexity of FDE techniques, in the same manner as the DFT has been used with waveforms that have been extended to transmit a cyclic prefix/postfix.

However, DTT-based FDE methods have not been applied to CPM because the concept of symmetric-periodic CPM does not exist.

Although it is relative straightforward to create a symmetrical extension to a linearly modulated full-response (i.e. memory-less) signal, it is actually quite challenging to do the same for CPM because the output waveform is a nonlinear function of the input symbols and because CPM systems have memory. This means that the waveform which is observed over a particular symbol interval is dependent on the current state of the system, which is a function of past symbols. Thus, in order to create special properties in the observed waveform (such as symmetry and periodicity), the transmitter must take the system memory into account and construct additional input symbols that will create the desired signal properties while preserving the continuous phase/constant envelope characteristics that make CPM so attractive. In fact, to date, the only low complexity FDE techniques that have been developed for use with CPM have been based on the construction of a cyclic extension to CPM (cyclic prefix). This generally requires the calculation of additional, input symbols as a function of the past information symbols in order to create the cyclic extension without destroying the continuous phase property of CPM, and the prior art (for the creation of cyclic extensions) has only focused on the binary single-h case, which is the least complex scenario.

The technique of creating a symmetric-periodic OFDM waveform for use with DTT-based FDE methods was first introduced in Giri Mandyam, "Sinusoidal Transforms in OFDM Systems", IEEE Transactions in Broadcasting, Vol. 50, No. 2, June 2004, pp. 172-184, where it was found that when the duration of the channel exceeded the length of the OFDM guard interval, that use of symmetric-periodic OFDM outperformed the use of cyclically extended OFDM due to the extra redundancy in the transmitted signal. In addition, when the received signal has been corrupted by bursty interference that is present over a portion of the block, the redundancy may be useful for interference cancellation.

However, there is no known prior art for creating a symmetric-periodic CPM waveform.

Need for a Solution

Finally, there is a need for a better approach to solve the aforementioned phase continuity problem for the following reasons: There has been a revival of interest in CPM signaling as an alternative to OFDM because of its spectral efficiency and because it's constant envelope property allows it to be used with less costly non-linear amplifiers without any signal distortion. In addition, future standards for networks like that for IEEE 802.16e, CDMA and GSM based networks, may develop special modes that promote the use of CPM waveforms. Moreover, with the rising popularity of DFT-based SC-FDE techniques and the recent interest in extending these techniques to CPM waveforms, it should be expected that any future standard that incorporates CPM will construct specifications for how the transmitter should incorporate a cyclic extension (prefix or postfix) into the CPM waveform. Since the current state of the art discussed above requires the CPM transmitter to do calculations based on past symbols or to do a table-lookup in order to create a cyclic extension, there is need for a simpler method that does not require any calculations or table look-up and which could conceivably be adopted as an alternative method by a future standards body.

SUMMARY OF THE INVENTION

This invention provides a new and unique method and apparatus to generate a sequence of symbols to be transmitted, comprising transmitting a block of symbols having data symbols and redundancy symbols, the redundancy symbols being generated based on the data symbols, a first part of the redundancy symbols being transmitted as a prefix of the block, a second part of the redundancy symbols being transmitted as a postfix of the block and a third part of the redundancy symbols being transmitted as an intermediate part of the block between the prefix part and the postfix part.

In one embodiment, the first part of the redundancy symbols may be generated from the symbols that are transmitted at the end of the data portion of the block, the second part of the redundancy symbols may be generated from the symbols that are transmitted at the start of a data portion of the block, the third part of the redundancy symbols (which are transmitted in the second half of the data portion of the block) may be generated from an entire sequence of non-redundant data symbols that are transmitted in the first half of the data portion of the block, and the block may form part of a continuous phase modulation (CPM) waveform that has a substantially symmetric period. In effect, excess symbols are added on both sides of the data block to be transmitted.

In operation, the method includes spreading an arbitrary sequence of N/2 M-ary information symbols over N+G symbol intervals such that a CPM transmitter can transmit a symmetric-periodically extended CPM waveform without having to calculate any special "channel" symbols, where N denotes the length of the data portion of a CPM block and G denotes the length of a cyclic extension. By doing so, the present invention makes the symmetric-periodic extension of CPM block transmissions as straightforward to implement as it is in linearly modulated, full-response (i.e. memory-less) systems, such as OFDM.

In effect, by transmitting each of the N/2 M-ary information symbols and its antipodal counterpart (i.e. $x_n$ and $-x_n$) in a specific order within the data portion of the CPM block and by judiciously assigning the modulation index for each pair ($x_n$ and $-x_n$), one can force the CPM waveform to become symmetric within the block and to be cyclically extended.

The present invention also provides for the transmitter to create a periodic extension of the signal in both directions (i.e. by using a cyclic prefix and a cyclic postfix). The cyclic prefix allows the state memory of the symbols sent during previous transmission blocks to be flushed and sets the conditions necessary for cyclic repetition, while the cyclic postfix creates the periodic extension of the symbols sent in the data portion of the CPM block.

The method may include equalizing a received symbol sequence using a DTT equalizer, as well as choosing an equalization scheme adaptively in a receiver as a DTT-based or DFT based scheme, where the equalization scheme is chosen based on radio channel characteristics and/or signal quality determinations based on either real-time or feedback information. The method has uplink signalling applications when battery power is an important concern.

The present invention is a low complexity method that forces the CPM block transmission to be symmetric over the interval of one data block and which constructs a cyclic extension (prefix or postfix) to the resulting waveform. The symmetric-periodicity of the CPM waveform allows the use of DTT-based SC-FDE techniques at the receiver as an alternative to DFT-based methods. Hence, this invention increases the level of flexibility in receiver design. In addition, since the symmetric-periodic waveform has a cyclic extension, the present invention may also be used in an adaptive receiver which selects between DFT-based FDE and DTT-based FDE depending on the pervading channel conditions.

The present invention also introduces redundancy into the transmission block which may lead (under certain channel conditions) to improved receiver performance vis-à-vis other CPM schemes that do not incorporate any form of redundancy. As discussed above, in "Sinusoidal Transforms in OFDM Systems", IEEE Transactions in Broadcasting, Vol. 50, No. 2, June 2004, pp. 172-184, it was found that when the duration of the channel exceeded the length of the OFDM guard interval, that use of symmetric-periodic OFDM outperformed the use of cyclically extended OFDM due to the extra redundancy in the transmitted signal. In addition, when the received signal has been corrupted by bursty interference that is present over a portion of the block, the redundancy may be useful for interference cancellation.

Moreover, there is a strong precedence for industry acceptance of redundancy in data transmissions, and we cite one pertinent example. The Wimedia (formerly MB-OFDM (MultiBand OFDM)) consortium has written PHY and MAC standards for MB-OFDM (Multi-Band OFDM) ultrawideband radio transmissions that have become an ECMA standard (i.e. the European association for standardizing information and communication systems). This standard has been heavily accepted and supported by >150 major companies worldwide that belong to the consortium. In that specification, the 53.3 and 80 Mbps modes send a conjugate symmetric OFDM symbol (which represents redundant spreading in the frequency domain) over two consecutive symbol periods (which represents redundant spreading in the time domain). This represents a total factor of 4 for the spreading. All other data rates that are below 480 Mbps use conjugate symmetric OFDM (spreading factor of 2 in the frequency domain). The only data rate that does not employ any form of spreading is the 480 Mbps mode. Hence, the use of spreading is an entirely acceptable practice and the redundancy can actually be useful for improving receiver performance in many cases of practical interest.

The present invention also includes a wireless network having a network node, point or element with a module to generate a sequence of symbols to be transmitted, the module transmitting a block of symbols having data symbols and redundancy symbols, the redundancy symbols being generated based on the data symbols, a first part of the redundancy symbols, being transmitted as a prefix to the block, a second part of the redundancy symbols being transmitted as a postfix of the block, and a third part of the redundancy symbols being transmitted as an intermediate part of the block between the prefix part and the postfix part. The wireless network may take the form of a Metropolitan Area Network (MAN) including that set forth according to the IEEE 802.16e Specification, as well as some other suitable network based on one or more of the 3GPP2, GSM, OFDM or CDMA network configurations.

The present invention also includes a network node, point or element, such as a CPM transmitter or a CPM receiver, having corresponding modules for respectively transmitting, receiving and/or processing the CPM transmission block according to the present invention. For example, a method to receive a sequence of symbols being transmitted may include receiving a block of symbols having data symbols and redundancy symbols, where the redundancy symbols were generated based on the data symbols, a first part of the redundancy symbols being received as a prefix of the block, a second part of the redundancy symbols being received as a postfix of the block, and a third part of the redundancy symbols being received as an intermediate part of the block between the prefix part and the postfix part.

The present invention also includes a computer program product with a program code, which program code is stored on a machine readable carrier, for carrying out the steps of a method to generate a sequence of symbols to be transmitted, comprising transmitting a block of symbols having data symbols and redundancy symbols, the redundancy symbols being generated based on the data symbols, a first part of the redundancy symbols being transmitted as a prefix of the block, a second part of the redundancy symbols being transmitted as a postfix of the block, and a third part of the redundancy symbols being transmitted as an intermediate part of the block between the prefix part and postfix part, when the computer program is run in a module of either a network node, point or element in a wireless network.

The present invention also includes implementing the one or more steps of the method via a computer program running in a processor, controller or other suitable module in one or more network nodes, points, terminals or elements in the wireless network.

In summary, in a DFT-based system, the receiver can exploit the cyclic convolution property of the DFT in order to make the linear convolution of the transmitted signal with the channel appear to be a cyclic convolution. Then, channel equalization becomes as simple as a single tap multiplication at each frequency. The family of transforms that belong to the Discrete Trigonometric Transform (DTT) include variations of the Discrete Cosine Transform and the Discrete Sine Transform. These transforms have efficient implementations, just as the DFT, and are used in many signal processing applications. DTT-based receivers can exploit the symmetric-convolution property of the DTT in order to develop low complexity FDE techniques. The symmetric convolution property is that if two finite, symmetrically extended sequences are cyclically convolved in the time domain, that this operation corresponds to the multiplication of the cosine/sine series coefficients in the frequency domain. Hence, the present DTT-based FDE techniques are developed based on this principle. DTT-based FDE methods have not been applied to CPM because the concept of symmetric-periodic CPM has not been invented. Although it is relatively straightforward to create a symmetrical extension to a linearly modulated full-response (i.e. memory-less) signal, it is actually quite challenging to do the same for CPM because the output waveform is a nonlinear function of the input symbols and because CPM systems have memory. This means that the waveform which is observed over a particular symbol interval is dependent on the current state of the system, the current input to the system and a certain number of past states. Thus, in order to create special properties in the observed waveform (such as symmetry and periodicity), the transmitter must take the system memory into account and construct additional input symbols that will create the desired signal properties while preserving the continuous phase/constant envelope characteristics that make CPM so attractive.

One advantage of the present invention is that DTT-based FDE techniques in the receiver can be used which has not been possible before as the waveform has not been guaranteed to be periodic and symmetrical. The present invention also does not exclude the using of DFT-based FDE. Therefore, the present invention increases flexibility, and encourages the use of CPM. The present invention provides a simple, low-complexity algorithm to create a symmetric-periodic CPM waveform that works for any general CPM signal format (binary, M-ary, single-h or multi-h). Moreover, the present invention also facilitates more flexibility at the CPM receiver since the waveform can be processed either with the DFT (since it will have a cyclic extension) or using the DTT (since it is symmetric-periodic), and so it allows the receiver to adapt based on channel conditions.

It is important to note that since a CPM waveform has memory that it is not straightforward to create either a periodic extension or a symmetric reflection about a particular point. For example, the problem of creating a cyclic prefix for binary single-h CPM has been studied and it was found that in order to do so, that the system would basically have to calculate special tail bits sections based on the information symbols sent in the block. Due to the system memory, the number of tail bits (and their values) change based on the sequence of information symbols. In addition, there are no published results available for creating a cyclic extension for CPM waveforms that use M-ary (M>2) or multi-h. There are only inferences that it can be done.

This invention goes one step beyond the state of the art because it facilitates the creation of a symmetric-periodic extension to CPM by using a low complexity method that can be applied to any M-ary multi-h CPM system. In addition, the notion of symmetric-periodic CPM has never been discussed in the literature and so this represents a totally new idea.

BRIEF DESCRIPTION OF THE DRAWING

The drawing includes the following Figures, which are not necessarily drawn to scale:

FIG. 10 shows a block diagram of an IEEE 802.16e simple campus configuration which may be adapted according to the present invention.

FIG. 11, including FIGS. 11*a* and 11*b*, shows a block diagram of a CPM transmitter and a CPM receiver according to the present invention.

The description below also includes Figures showing various formats for illustrating the present invention.

BEST MODE OF THE INVENTION

The present invention provides a new and unique method and apparatus to generate a sequence of symbols to be transmitted,—that features transmitting a block of symbols having data symbols and redundancy symbols, the redundancy symbols being generated based on the data symbols, a first part of the redundancy symbols being transmitted as a prefix of the block, a second part of the redundancy symbols being transmitted as a postfix of the block and a third part of the redundancy symbols being transmitted as an intermediate part of the block between the prefix part and postfix part. In one embodiment, the first part of the redundancy symbols may be generated from the symbols that are transmitted at the end of a data portion of the block, the second part of the redundancy symbols may be generated from the symbols that are transmitted at the start of the data portion of the block, the third part of the redundancy symbols (which are transmitted in the second half of the data portion of the block) may be generated from an entire sequence of non-redundant data symbols that are transmitted in the first half of the data portion of the block. As shown and described herein, the block forms part of a continuous phase modulation (CPM) waveform that has a substantially symmetric period.

Figure 1A:
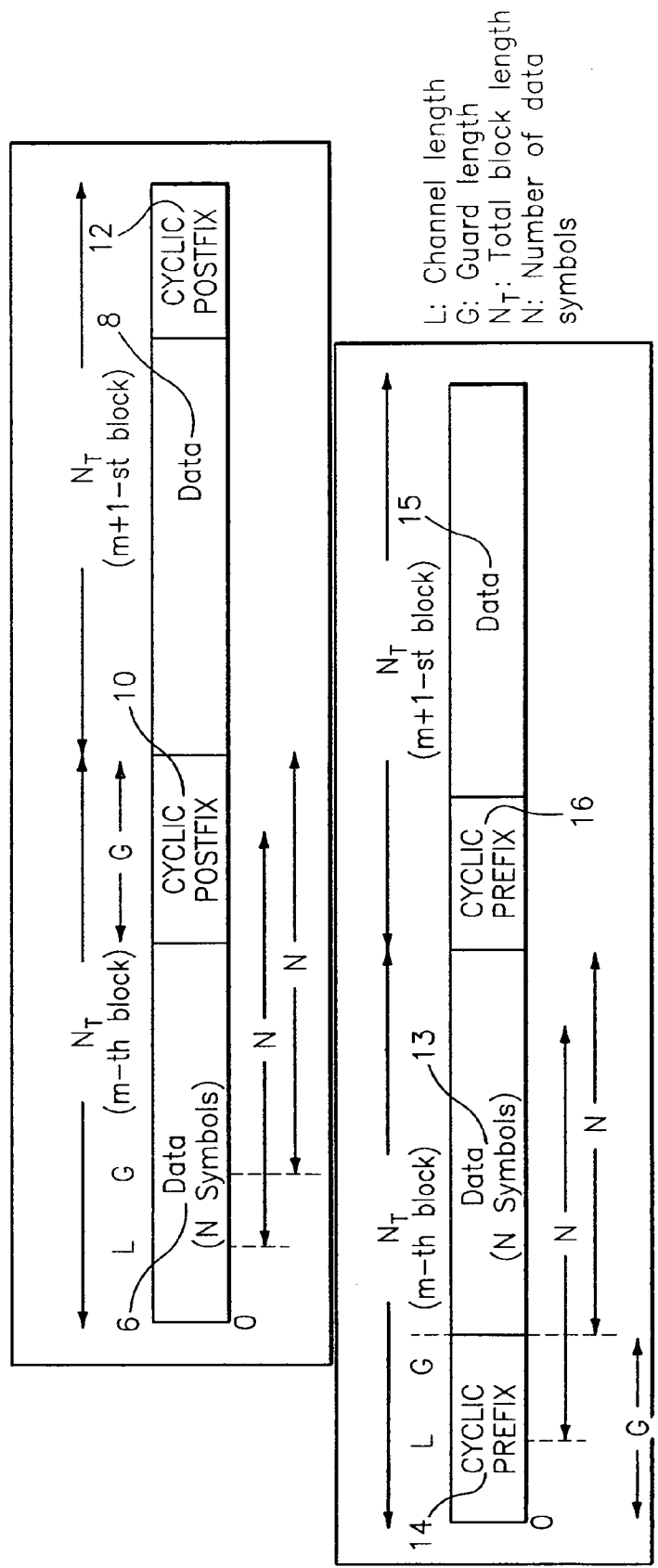
FIG. 1A shows an illustration of one block of data, which has been constructed to have either a cyclic postfix or prefix, and the window over which the signal may be processed to obtain an equivalent receiver output.
Figure 1B:
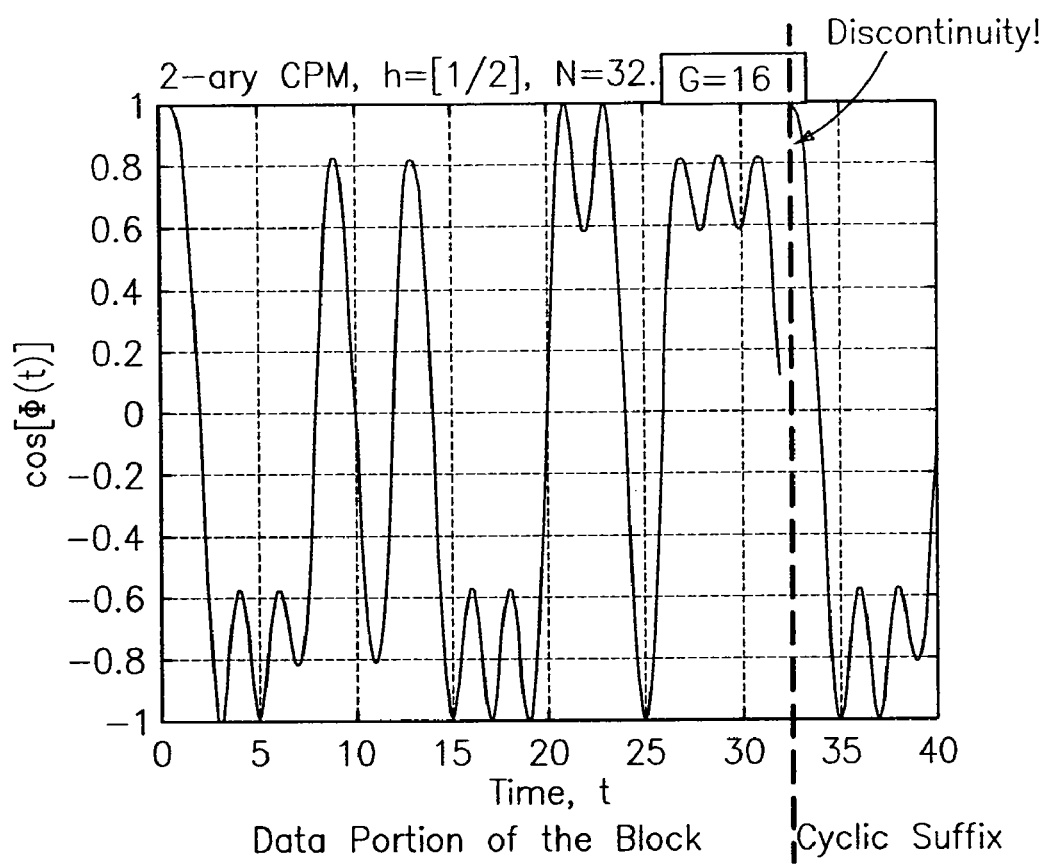
FIG. 1B shows an example of a blind introduction of a cyclic extension, which can destroy the continuous phase property of the CPM waveform signal.
Figure 2:
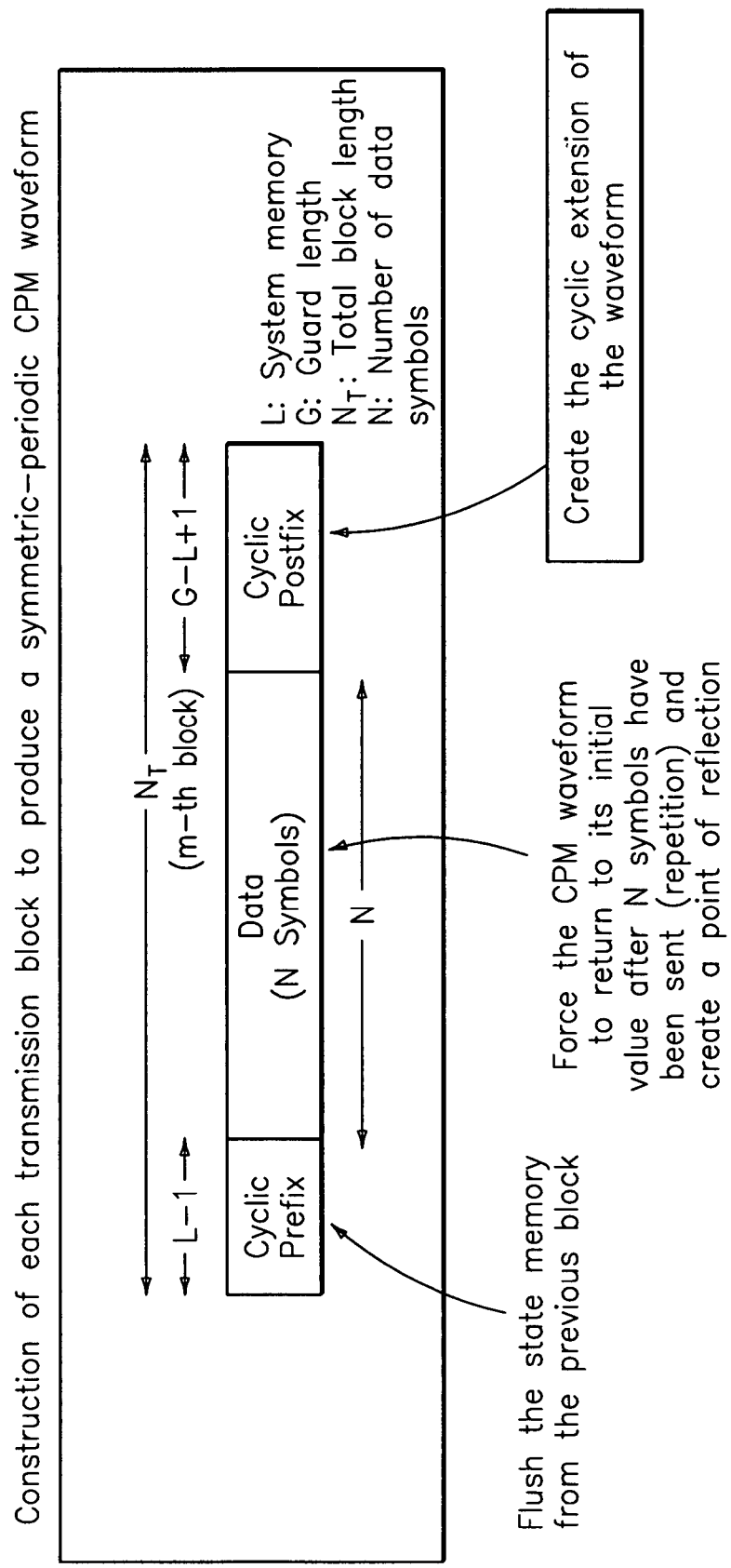
FIG. 2 shows the construction of each transmission block to product a symmetric-periodic CPM waveform.

FIG. 2 shows the construction of each transmitted block to produce a symmetrically-periodic CPM waveform according to the present invention. As shown, each transmitted block of data is linearly convolved with the channel. By creating waveform symmetry about the mid-point of the block transmission and by creating a cyclic extension to each block, one can make the linear convolution between the block and the channel appear to be a symmetric convolution. In the frequency domain, one can implement a single-tap channel DTT-based equalizer at each frequency. In order to create a symmetric periodic CPM waveform, three things are done:

1) Generate L−1 cyclic prefix symbols to flush the state memory from the previous block; The number of prefix symbols can be selected based on the anticipated length of the channel impulse response and the known memory of the CPM waveform. The anticipated channel length can be selected based on knowledge of typical/worst case radio channel conditions and the known memory of the CPM waveform.

2) Construct the N data symbols such that the CPM waveform returns to its initial value after the N symbols have been transmitted (periodicity); and 3) Construct the N data symbols such that the CPM waveform has symmetry about a reflection point.

Figure 3:
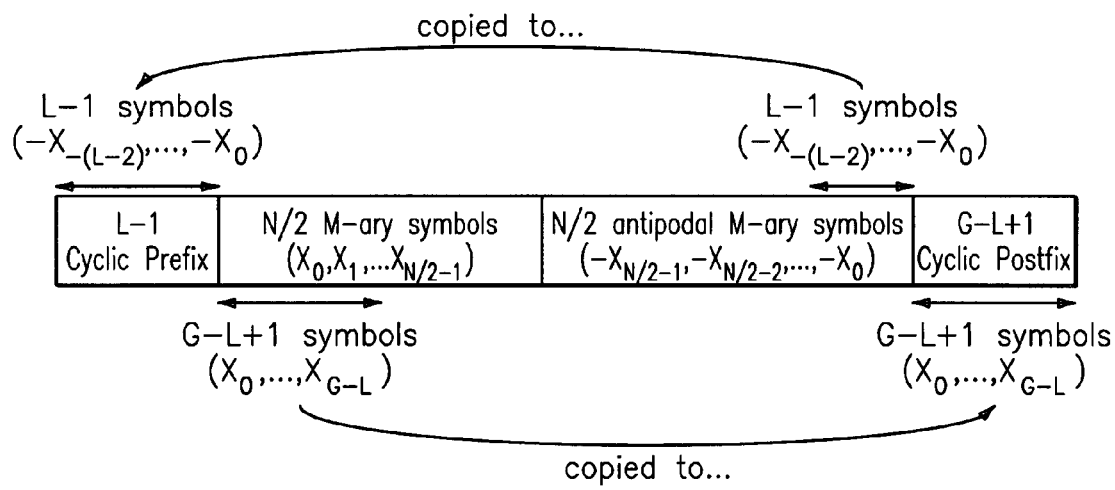
FIG. 3 shows a special construction of the transmission block to force symmetric-periodicity according to the present invention.

FIG. 3 shows a special construction of the transmission block to force symmetric-periodicity, wherein each transmission block contains N+G symbols and consists of the following:

1) Length L−1 cyclic prefix to flush the state memory;

2) Length N/2 M-ary information symbols;

3) Length N/2 anti-podal counterparts of the M-ary symbols; and

4) Length G−L+1 cyclic post-fix. The parameter G is selected to be at least twice the anticipated length of the channel impulse response and the known memory of the CPM waveform. The anticipated channel length can be selected based on knowledge of typical/worst case radio channel conditions and the known memory of the CPM waveform.

By its construction, this transmission block is periodically extended in both directions by using a total of G symbols (where G is selected based on the overall channel memory).

Figure 4:
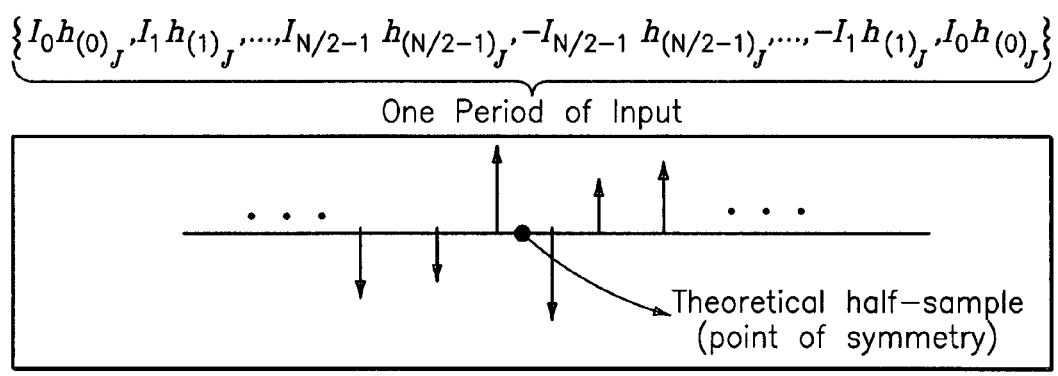
FIG. 4 shows a half sample anti-symmetric sequence according to the present invention.
Figure 5:
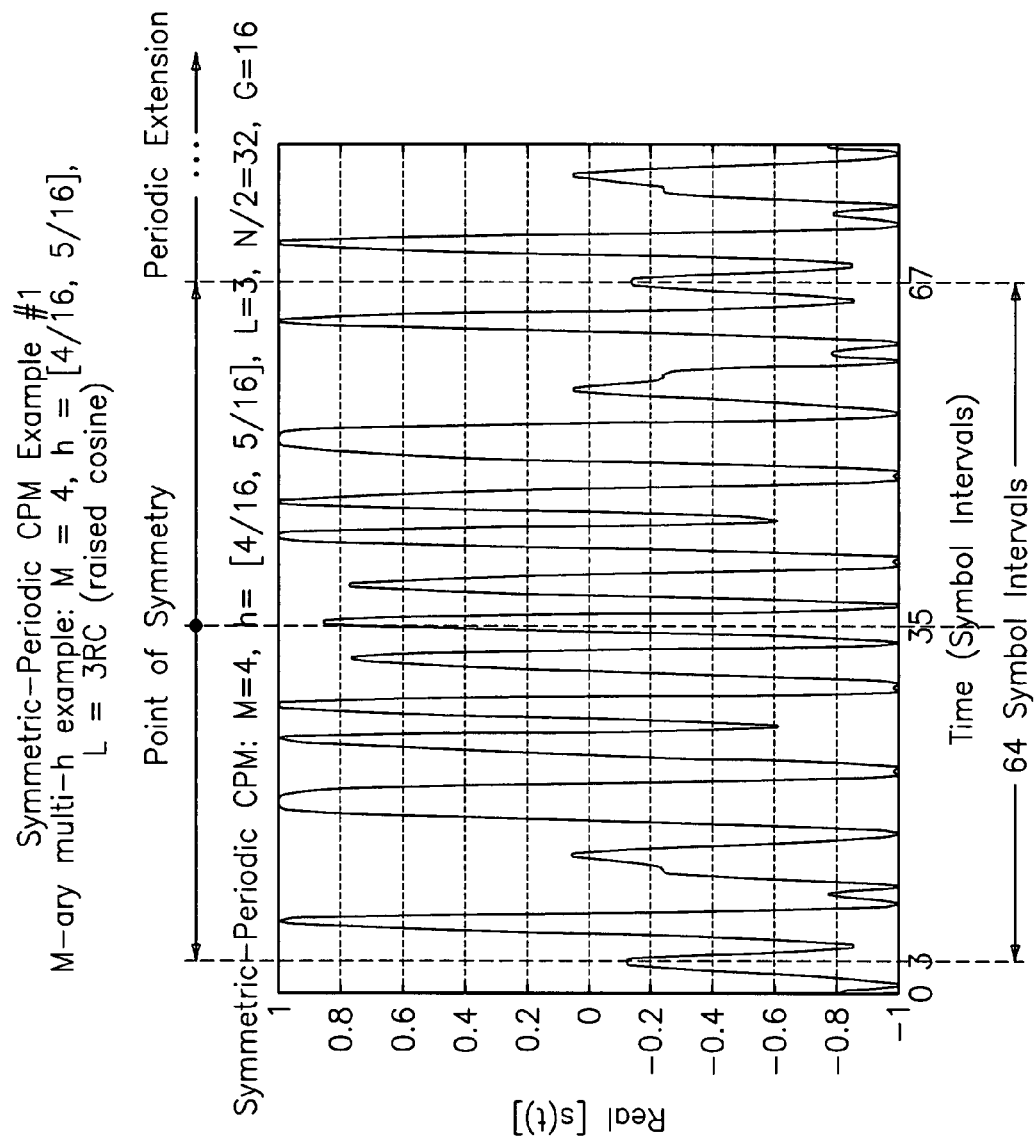
FIG. 5 is a symmetric periodic CPM example #1 (M-ary multi-h with M=4, h=[4/16, 5/16] and L=3) according to the present invention.
Figure 6:
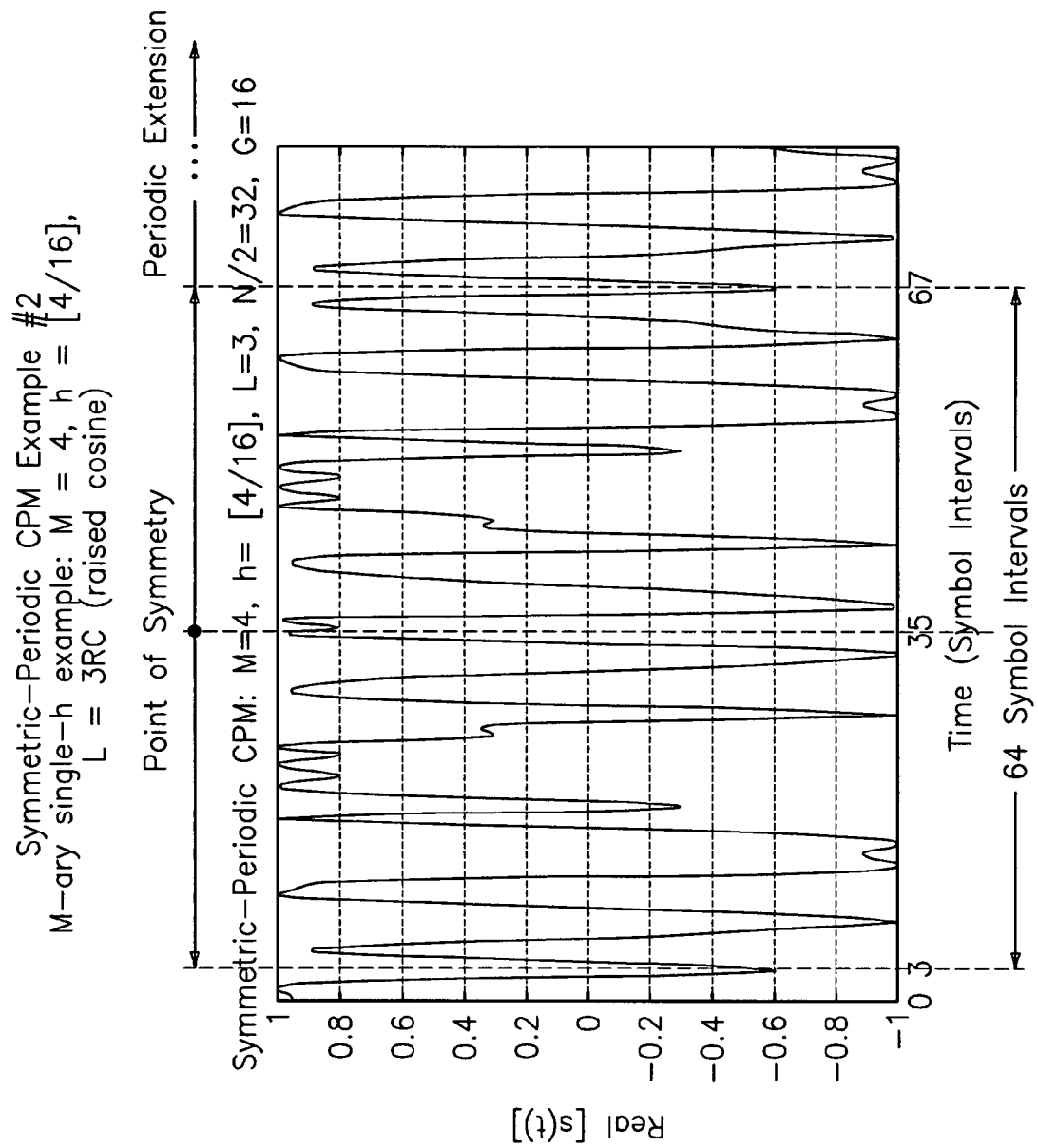
FIG. 6 is a symmetric periodic CPM example #2 (M-ary single-h with M=4, h=[4/16] and L=3) according to the present invention.
Figure 7:
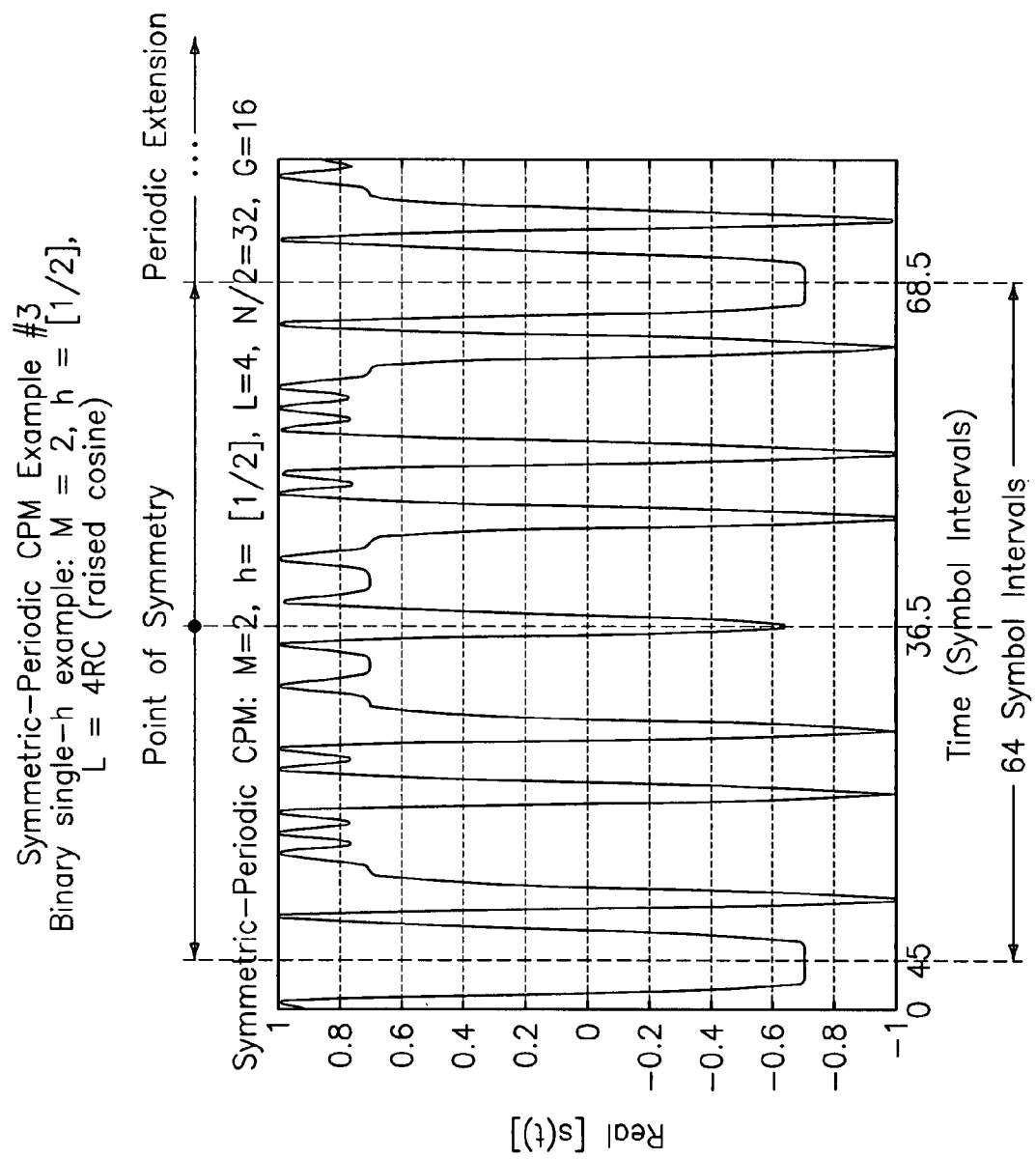
FIG. 7 is a symmetric periodic CPM example #3 (Binary single-h with M=2, h=[1/2] and L=4) according to the present invention.
Figure 8:
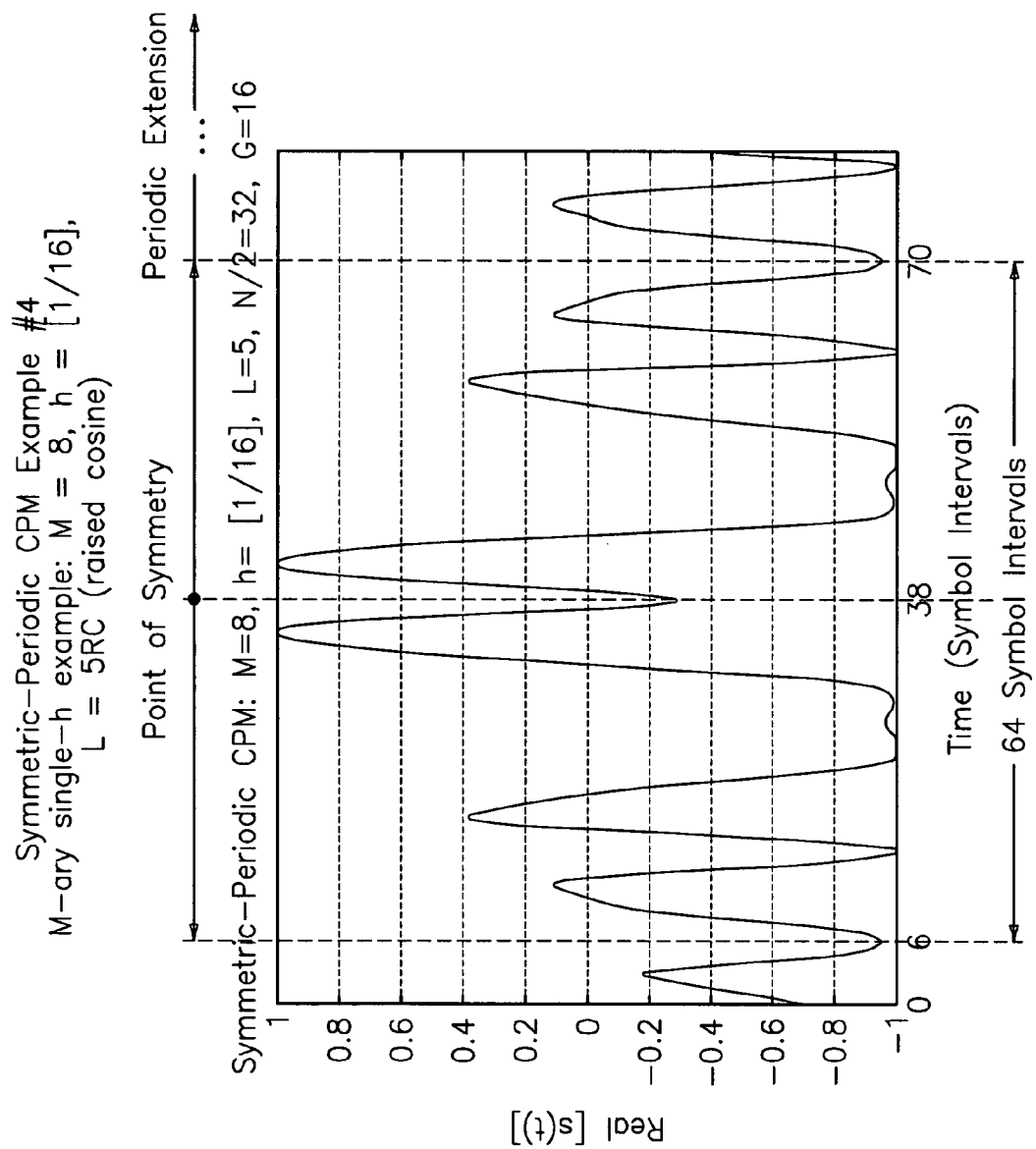
FIG. 8 is a symmetric periodic CPM example #4 (M-ary single-h with M=8, h=[1/16] and L=5) according to the present invention.
Figure 9:
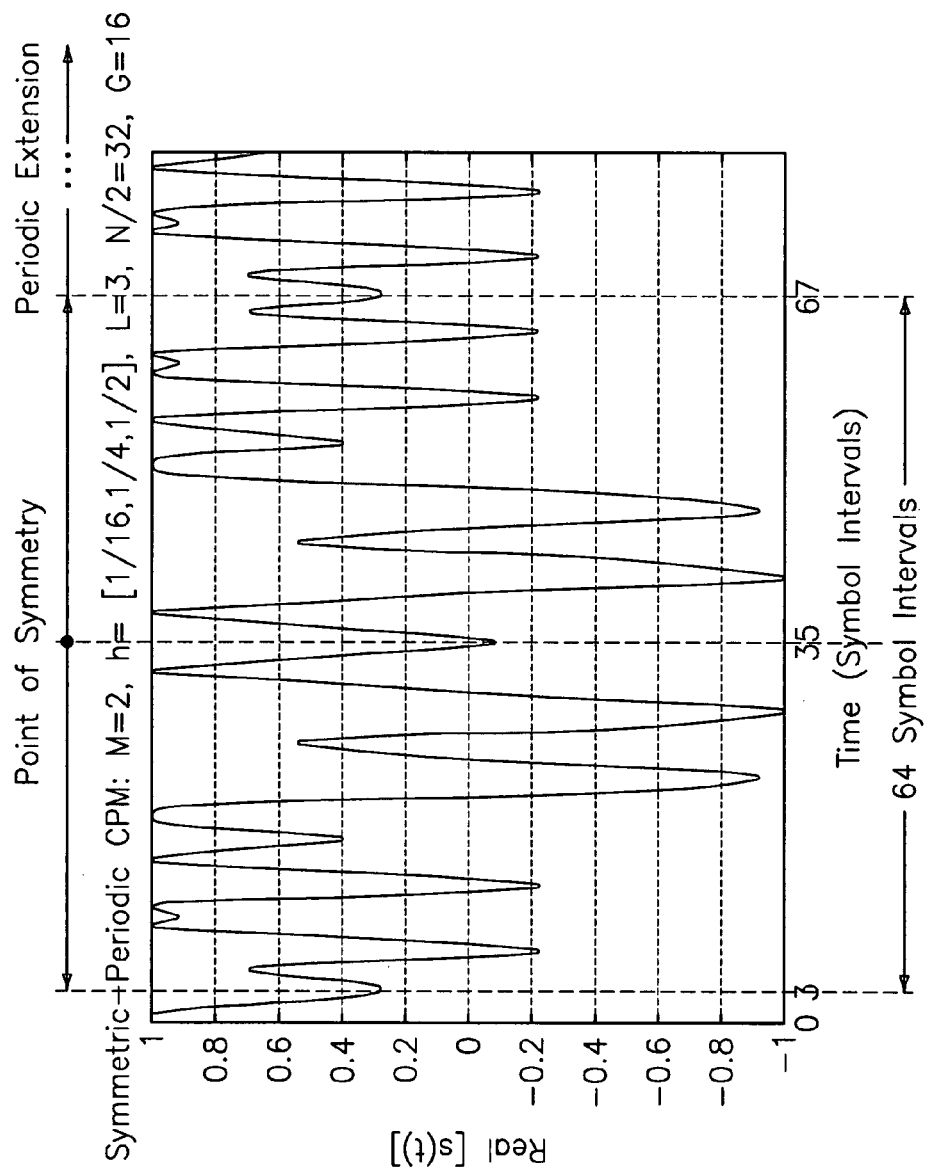
FIG. 9 is a symmetric periodic CPM example #5 (Binary multi-h with M=2, h=[1/16, 1/4, 1/2] and L=3) according to the present invention.

FIG. 4 shows a half sample anti-symmetric sequence and a theoretical half sample (point of symmetry). Consistent with that described in detail below, in order to force symmetry and periodicity, the M-ary data symbols are transmitted in the following order:

1) Length (L−1) Cyclic Prefix;

2) N M-ary Symbols; and

3) Length (G−L−1) Cyclic Postfix.

See Equations 5 below, which include equations for the transmitted symbols, the modulation indices and the discrete time index. The associated modulation indices are shown cycling through J different values. The input product sequence to the CPM modulator has half sample anti-symmetry, which is illustrated in FIG. 4. It is also extended periodically in both directions (over a finite number of symbols). This forces the CPM waveform to also exhibit symmetry and periodicity.

Implementation

In particular, the present invention may be implemented based on the following:

By transmitting the M-ary symbols and the modulation indices in the following order within each transmission block, one can create a symmetric-periodic CPM waveform, as follows using the Equations (5) below.

$$x = \left\{ \underbrace{-I_{(L-2)}, \cdots, -I_0}_{L-1\,Cyclic\,Prefix}, \underbrace{I_0, I_1, \cdots, I_{N/2-1}, -I_{N/2-1}, \cdots, -I_1, -I_0}_{M\text{-}ary\,Data\,Symbols}, \underbrace{I_0, I_1, \cdots, I_{G-L}}_{G-L+1\,Cyclic\,Postfix} \right\} \text{(Transmitted Symbols)} \quad (5)$$

$$h = \left\{ \underbrace{h_{(L-2)_J} \cdots h_{(0)_J}, h_{(0)_J}, h_{(1)_J}, \cdots}_{Cyclic\,Prefix\,Interval}, \underbrace{h_{(N/2-1)_J}, h_{(N/2-1)_J}, \cdots, h_{(1)_J}, h_{(0)_J}}_{Data\,Interval}, \underbrace{h_{(0)_J}, h_{(1)_J}, \cdots, h_{(G-L)_J}}_{Postfix\,Interval} \right\} \text{(Modulation Indices)}$$

$$n = \left\{ \underbrace{-(L-1), \cdots, -1}_{Cyclic\,Prefix\,Interval}, \underbrace{0, 1, \cdots, N/2-1, N/2, \cdots, N-1}_{Data\,Interval}, \underbrace{N, N+1, \cdots, N+G-L}_{Postfix} \right\} \text{(Discrete Time Index)}$$

The assumption is that the modulation indices cycle through J values. Hence, $h_{(m)_J} = h_{m\,mod\,J}$.

The general expression for a CPM waveform is given by $$s(t) = \exp(j\Phi(t)) \qquad (6)$$

$$\Phi(t) = 2\pi \sum_{i=-\infty}^{\infty} h_{(i)_J} x_i q(t - iT),\qquad (7)$$

where $x_i$ denotes an M-ary symbol and the phase function is define as the integral of the frequency pulse function of the CPM signal (which is non-zero over the interval $0 < t < LT$).

$$q(t) = \int_0^t f(\tau)d\tau \quad \text{for } 0 < t < LT \qquad (7)$$

$$q(t) = 1/2 \quad \text{for } t \geq LT.$$

The cumulative phase term represents the contributions of all symbols for which q(t) has reached its final value of ½ (i.e. all terms in which q(t−it)≧LT. Over the nth symbol interval, it is defined as $$\theta_n = \sum_{i=-\infty}^{n-L} h_{(i)_J} x_i \qquad (8)$$

The cumulative phase term represents the CPM system memory. As such, the key to proving that the construction in Equation (5)) results in a symmetric periodic waveform is to demonstrate that that property exists for the cumulative phase term.

Let us define the cumulative phase over the $0^{th}$ symbol interval as $\theta_0 = \Omega_0$, where $\Omega_0$ is arbitrary. Then, based on the construction of Equation (5)—and the definition in Equation (8)—, the cumulative phase terms are defined as in Equations (9) as follows:

$\theta_0 = \Omega_0$ $\theta_1 = \Omega_0 - I_{L-2} h_{(L-2)_J}$ $\theta_2 = \Omega_0 - I_{L-2} h_{(L-2)_J} - I_{L-3} h_{(h-3)_J} M$ $\theta_{L-1} = \Omega_0 - I_{L-2} h_{(L-2)_J} - \Lambda - I_0 h_{(0)_J}$ $\theta_L = \Omega_0 - I_{L-2} h_{(L-2)_J} - \Lambda - I_2 h_{(2)_J} - I_1 h_{(1)_J}$ $\theta_{L+1} = \Omega_0 - I_{L-2} h_{(L-2)_J} - \Lambda - I_2 h_{(2)_J} M$ $\theta_{2L-3} = \Omega_0 - I_{L-2} h_{(L-2)_J}$ $\theta_{2L-2} = \Omega_0$ $\theta_{2L-1} = \Omega_0 + I_{L-1} h_{(L-1)_J}$ $\theta_{2L} = \Omega_0 + I_{L-1} h_{(L-1)_J} + I_L h_{(L)_J}$ $\theta_{2L+1} = \Omega_0 + I_{L-1} h_{(L-1)_J} + I_L h_{(L)_J} + I_{L+1} h_{(L+1)_J} M$ $\theta_{N/2+L-1} = \Omega_0 + I_{L-1} h_{(L-1)_J} + I_L h_{(L)_J} + I_{L+1} h_{(L+1)_J} + \Lambda + I_{N/2-1} h_{(N/2-1)_J}$ $\theta_{N/2+L} = \Omega_0 I_{L-1} h_{(L-1)_J} + I_L h_{(L)_J} + I_{L+1} h_{(L+1)_J} + \Lambda + I_{N/2-1} h_{(N/2-1)_J} + I_{N/2} h_{(N/2)_J}$ $\theta_{N/2+L+1} = \Omega_0 I_{L-1} h_{(L-1)_J} + I_L h_{(L)_J} + I_{L+1} h_{(L+1)_J} + \Lambda + I_{N/2-1} h_{(N/2-1)_J} = \theta_{N/2+L-1} M$ $\theta_{N+1} = \Omega_0 + I_{L-1} h_{(L-1)_J} = \theta_{2L-1}$ $\theta_{N+2} = \Omega_0 = \theta_{2L-2}$ $\theta_{N+3} = \Omega_0 - I_{L-2} h_{(L-2)_J} = \theta_{2L-3}$ $\theta_{N+4} = \Omega_0 - I_{L-2} h_{(L-2)_J} - I_{L-3} h_{(L-3)_J} = \theta_{2L-4} M$ $\theta_{N+L} = \Omega_0 - I_{L-2} h_{(L-2)_J} - I_{L-3} h_{(L-3)_J} - \Lambda - I_1 h_{(1)_J} = \theta_L$ $\theta_{N+L+1} = \Omega_0 - I_{L-2} h_{(L-2)_J} - I_{L-3} h_{(L-3)_J} - \Lambda - I_1 h_{(1)_J} - I_0 h_{(0)_J} = \theta_{L-1}$ $\theta_{N+L+2} = \Omega_0 - I_{L-2} h_{(L-2)_J} - I_{L-3} h_{(L-3)_J} - \Lambda - I_1 h_{(1)_J} = \theta_L$ $\theta_{N+L+3} = \Omega_0 - I_{L-2} h_{(L-2)_J} - I_{L-3} h_{(L-3)_J} - \Lambda - I_2 h_{(2)_J} = \theta_{L+1}$ $\theta_{N+L+4} = \Omega_0 - I_{L-2} h_{(L-2)_J} - I_{L-3} h_{(L-3)_J} - \Lambda - I_3 h_{(3)_J} = \theta_{L+2} M \qquad (9)$ If one discards the first L−1 points, these equations reveal the two key properties of this waveform:

There is symmetry about the point n=N/2+L since $\theta_{N/2+L+n} = \theta_{N/2+L-n}$ (for n=1, ..., N/2+1).

The transmission block repeats itself after n=N+L symbol intervals (i.e. starting with n=N+L+1).

Thus, the proof is completed. At this point, one presents an illustrative example to further demonstrate the proof. In this example, L=4, J=1 and N=26. The cumulative phase terms are calculated below.

$$\begin{aligned}
\theta_0 &= \Omega_0 \\
\theta_1 &= \Omega_0 - I_2 h_2 \\
\theta_2 &= \Omega_0 - I_2 h_2 - I_1 h_1 \\
\theta_3 &= \Omega_0 - I_2 h_2 - I_1 h_1 - I_0 h_0 \\
\theta_4 &= \Omega_0 - I_2 h_2 - I_1 h_1 \\
\theta_5 &= \Omega_0 - I_2 h_2 \\
\theta_6 &= \Omega_0 \\
\theta_7 &= \Omega_0 + I_3 h_3 \\
\theta_8 &= \Omega_0 + I_3 h_3 + I_4 h_4 \\
\theta_9 &= \Omega_0 + I_3 h_3 + I_4 h_4 + I_5 h_5 \\
\theta_{10} &= \Omega_0 + \sum_{n=3}^{6} I_n h_n \\
\theta_{11} &= \Omega_0 + \sum_{n=3}^{7} I_n h_n \\
\theta_{12} &= \Omega_0 + \sum_{n=3}^{8} I_n h_n \\
\theta_{13} &= \Omega_0 + \sum_{n=3}^{9} I_n h_n \\
\theta_{14} &= \Omega_0 + \sum_{n=0}^{10} I_n h_n \\
\theta_{15} &= \Omega_0 + \sum_{n=3}^{11} I_n h_n \\
\theta_{16} &= \Omega_0 + \sum_{n=3}^{12} I_n h_n \\
\theta_{17} &= \theta_{N/2+L} = \Omega_0 + \sum_{n=3}^{13} I_n h_n
\end{aligned}$$ (10)

$$\begin{aligned}
\theta_{18} &= \Omega_0 + \sum_{n=3}^{12} I_n h_n = \theta_{16} \\
\theta_{19} &= \Omega_0 + \sum_{n=3}^{11} I_n h_n = \theta_{15} \\
\theta_{20} &= \Omega_0 + \sum_{n=3}^{10} I_n h_n = \theta_{14} \\
\theta_{21} &= \Omega_0 + \sum_{n=3}^{9} I_n h_n = \theta_{13} \\
\theta_{22} &= \Omega_0 + \sum_{n=3}^{8} I_n h_n = \theta_{12} \\
\theta_{23} &= \Omega_0 + \sum_{n=3}^{7} I_n h_n = \theta_{11} \\
\theta_{24} &= \Omega_0 + \sum_{n=3}^{6} I_n h_n = \theta_{10} \\
\theta_{25} &= \Omega_0 + \sum_{n=3}^{5} I_n h_n = \theta_9 \\
\theta_{26} &= \Omega_0 + \sum_{n=3}^{4} I_n h_n = \theta_8 \\
\theta_{27} &= \Omega_0 + \sum_{n=3}^{3} I_n h_n = \theta_7 \\
\theta_{28} &= \Omega_0 = \theta_6 \\
\theta_{29} &= \Omega_0 - I_2 h_2 = \theta_5 \\
\theta_{30} &= \Omega_0 - I_2 h_2 - I_1 h_1 = \theta_4 \\
\theta_{31} &= \Omega_0 - I_2 h_2 - I_1 h_1 - I_0 h_0 = \theta_3 \\
\theta_{32} &= \Omega_0 - I_2 h_2 - I_1 h_1 = \theta_4 \\
\theta_{33} &= \Omega_0 - I_2 h_2 = \theta_5 \\
\theta_{34} &= \Omega_0 = \theta_6 \\
\theta_{35} &= \Omega_0 + I_3 h_3 = \theta_7 \\
M &
\end{aligned}$$ (10)

Hence, after discarding the first L−1 terms, one observes that the symmetric-periodic property exists as asserted in the theoretical proof.

FIGS. 5-9

FIGS. 5-9 show examples of symmetric-periodic CPMs according to the present invention.

Applications

This invention might be used as a part of the transmission specifications for a future IEEE standard (such as future 802.16e, GSM, OFDM or CDMA) that supports CPM as an alternative uplink modulation. The recent revival of interest in CPM, coupled with the recent discovery of DTT-based equalization schemes, makes this invention important for the design of low complexity CPM symmetric-periodic extension schemes. In addition, the ability to create a symmetric-periodic extension for CPM should encourage flexibility and innovation in the receiver design.

The present invention may be implemented in a wireless network having a network node, point or element with a module to transmit a block of symbols having data symbols and a redundancy part, a first part of redundancy part of a transmitted symbol block being transmitted as a prefix to the block, a second part of the redundancy part of the block being transmitted as a postfix of the redundancy part and a third part of the redundancy symbols (which are transmitted in the second half of the data portion of the block) being generated from an entire sequence of non-redundant data symbols that are transmitted in the first half of the data portion of the block. The wireless network may take the form of a Metropolitan Area Network (MAN) including that set forth according to the IEEE 802.16e Specification, as well as some other suitable network based on one or more of the 3GPP2, GSM, OFDM or CDMA network configurations.

For example, FIG. 10 shows an example of one such network configuration in the form of an IEEE 802.16e simple campus configuration taken from Chapter 6 (FIG. 6.9) of C. Smith et al., "3G Wireless and WiMax and Wi-Fi 802.16 and 802.11," The McGraw-Hill Companies, Inc. 2005, which illustrates a subscriber accessing the 2.5G/3G packet data network via one or more 802.16e broadband links that may be configured according to the present invention. In the IEEE 802.16e simple campus configuration in FIG. 10, the smart phone, the BTS(a), BTS(b) and router as shown could be implemented with transmitter and receivers according to the present invention, consistent with that shown in FIGS. 11a and 11b below.

The present invention may also be used as a part of the transmission specifications for a future standard (such as future IEEE 802.16e, GSM, OFDM or CDMA) that supports CPM as an alternative uplink modulation. The recent revival of interest in CPM, coupled with the popularity of DFT-based linear equalization schemes, makes the present invention an important contribution for the design of low complexity CPM cyclic extension schemes.

The present invention may be used in conjunction with Wimax, with the intention of introducing it into future IEEE 802.16e networks. In addition, embodiment are envisioned in which the present invention may be used in 3GPP2, which will soon start to look at their next evolution, and where there may be some potential to introduce CPM into those future networks. Moreover, there is also a strong potential for the present invention to have applications in GSM to increase its spectral efficiency, since that system currently uses binary single-h CPM (via GMSK).

The Transmitter/Receiver Node, Point or Element

FIG. 11a shows an example of a CPM transmitter generally indicated as 100 having a symmetric periodic CPM waveform module 102 according to the present invention, as well as other transmitter modules 104. In operation, the symmetric periodic CPM waveform module 102 generates a substantially symmetric-periodic continuous phase modulation (CPM) waveform by transmitting a block of symbols having data symbols and a redundancy part, a first part of redundancy part of a transmitted symbol block being transmitted as a prefix to the block, a second part of the redundancy part of the block being transmitted as a postfix of the redundancy part, and a third part of the redundancy symbols (which are transmitted in the second half of the data portion of the block) being generated from an entire sequence of non-redundant data symbols that are transmitted in the first half of the data portion of the block consistent with that shown and described herein.

FIG. 11b shows an example of a CPM receiver generally indicated as 200 having a symmetric periodic CPM waveform module 202 according to the present invention, as well as other receiver modules 204. In operation, the symmetric periodic CPM waveform module 202 processes the CPM transmission block received from the CPM transmitter, consistent with that shown and described herein.

The Basic Receiver/Transceiver Functionality

The basic functionality of the CPM transmitter 100 and the receiver 200 according to the present invention may be implemented as follows:

By way of example, and consistent with that described herein, the functionality of the modules 102 and 202 may be implemented using hardware, software, firmware, or a combination thereof, although the scope of the invention is not intended to be limited to any particular embodiment thereof. In a typical software implementation, the module 102 and 202 would be one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation.

The scope of the invention is not intended to be limited to any particular implementation using technology now known or later developed in the future. Moreover, the scope of the invention is intended to include the modules 102 and 202 being used as stand alone modules, as shown, or in the combination with other circuitry for implementing another module.

The other modules 104 and 204 and the functionality thereof are known in the art, do not form part of the underlying invention per se, and are not described in detail herein.

Advantages

Advantages of the present invention may include the following:

The present invention may be used to improve receiver performance since the data block contains two copies of each symbol.

Because the symmetric-periodic CPM waveform is both periodic and symmetric-periodic, one can adaptively select to use either DFT-based or DTT-based FDE techniques at the receiver based on the current channel conditions. This adds a level of flexibility that can lead to an improvement in receiver performance.

By providing methods to create symmetric-cyclic extensions to CPM, one enables the use of low complexity DTT-based FDE techniques at the receiver. This opens up a whole new field of research for CPM.

By providing low complexity methods to create symmetric-cyclical extensions to CPM, one helps to remove some of the possible reservations against the use of CPM.

The present invention maintains the same level of transmitter complexity for all CPM variants (i.e. single-h, multi-h, binary, M-ary, etc.).

The use of symmetric-periodic CPM encourages flexibility in transmitter/receiver design.

The present invention provides the first known solution to create symmetric-periodic CPM.

List of Abbreviations

CPM: Continuous Phase Modulation
FDE: Frequency Domain Equalization
ISI: Inter-symbol interference
MAC: Medium Access Control (Layer)
MBOA: MultiBand OFDM Alliance
MB-OFDM: Multiband OFDM
PHY: Physical (Layer)
SC-FDE: Single Carrier Frequency Domain Equalization
UWB: Ultrawideband Scope of the Invention Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

What I claim is:

1. A method to generate a sequence of symbols to be transmitted, comprising:
    transmitting a block of symbols having data symbols and redundancy symbols, the redundancy symbols being generated based on the data symbols, a first part of the redundancy symbols being transmitted as a prefix of the block, a second part of the redundancy symbols being transmitted as a postfix of the block, a third part of the redundancy symbols being transmitted as an intermediate part of the block between the prefix part and postfix part, and the block forming part of a continuous phase modulation waveform that has a substantially symmetric period.

2. A method according to claim 1, wherein the method includes equalizing a received symbol sequence using a discrete trigonometric transform equalizer.

3. A method according to claim 1, wherein the method includes choosing an equalization scheme adaptively in a receiver as a discrete trigonometric transform based or discrete Fourier transform based scheme.

4. A method according to claim 3, wherein the equalization scheme is chosen based on radio channel characteristics and/or signal quality determinations based on either real-time or feedback information.

5. A method according to claim 1, wherein the method includes transmitting each information symbol and its antipodal counterpart in a specific order within a data portion of the continuous phase modulation waveform.

6. A method according to claim 1, wherein the prefix allows the state memory of symbols sent during previous transmission blocks to be flushed and sets conditions necessary for cyclic repetition.

7. A method according to claim 1, wherein the postfix creates the periodic extension of symbols in the data portion of the continuous phase modulation waveform.

8. A method according to claim 1, wherein the method includes spreading an arbitrary sequence of N/2 M-ary information symbols over N+G symbol intervals such that a continuous phase modulation transmitter can transmit a symmetric-periodically extended continuous phase modulation waveform without having to calculate any special "channel" symbols, where N denotes the length of the data portion of a continuous phase modulation block and G denotes the length of a cyclic extension.

9. A method according to claim 1, wherein the method is used in uplink signaling applications when battery power is an important concern.

10. A wireless network having a network node, point or element comprising:
    a module configured to generate a sequence of symbols to be transmitted, by transmitting a block of symbols having data symbols and redundancy symbols, the redundancy symbols being generated based on the data symbols, a first part of the redundancy symbols being transmitted as a prefix of the block, a second part of the redundancy symbols being transmitted as a postfix of the block, a third part of the redundancy symbols being transmitted as an intermediate part between the prefix part and postfix part of the block, and the block forming part of a continuous phase modulation waveform that has a substantially symmetric period.

11. A wireless network according to claim 10, wherein the module is configured to equalize a received symbol sequence using a discrete trigonometric transform equalizer.

12. A wireless network according to claim 10, wherein the module is configured to choose an equalization scheme adaptively in a receiver as a discrete trigonometric transform based or discrete Fourier transform based scheme.

13. A wireless network according to claim 12, wherein the equalization scheme is chosen based on radio channel characteristics and/or signal quality determinations based on either real-time or feedback information.

14. A wireless network according to claim 10, wherein the module is configured to transmit each information symbol and its antipodal counterpart in a specific order within a data portion of the continuous phase modulation waveform.

15. A wireless network according to claim 10, wherein the prefix allows the state memory of symbols sent during previous transmission blocks to be flushed and sets conditions necessary for cyclic repetition.

16. A wireless network according to claim 10, wherein the postfix creates the periodic extension of symbols in the data portion of the continuous phase modulation waveform.

17. A wireless network according to claim 10, wherein the module is configured to spread an arbitrary sequence of N/2 M-ary information symbols over N+G symbol intervals such that a continuous phase modulation transmitter can transmit a symmetric-periodically extended continuous phase modulation waveform without having to calculate any special "channel" symbols, where N denotes the length of the data portion of a continuous phase modulation block and G denotes the length of a cyclic extension.

18. A wireless network according to claim 10, wherein the module is configured to be used in uplink signaling applications when battery power is an important concern.

19. A network node, point or element comprising:
a module configured to generate a substantially symmetric-periodic continuous phase modulation waveform, by transmitting a block of symbols having data symbols and a redundancy part, a first part of redundancy part of a transmitted symbol block being transmitted as a prefix to the block, a second part of the redundancy part of the block being transmitted as a postfix of the redundancy part, a third part of the redundancy symbols being transmitted as an intermediate part of the block between the prefix part and postfix part, and the block forming part of a continuous phase modulation waveform that has a substantially symmetric period.

20. A network node, point or element according to claim 19, wherein the module is configured to equalize a received symbol sequence using a discrete trigonometric transform equalizer.

21. A network node, point or element according to claim 19, wherein the module is configured to choose an equalization scheme adaptively in a receiver as a discrete trigonometric transform based or discrete Fourier transform based scheme.

22. A network node, point or element according to claim 21, wherein the equalization scheme is chosen based on radio channel characteristics and/or signal quality determinations based on either real-time or feedback information.

23. A network node, point or element according to claim 19, wherein the module is configured to transmit each information symbol and its antipodal counterpart in a specific order within a data portion of the continuous phase modulation waveform.

24. A network node, point or element according to claim 19, wherein the prefix allows the state memory of symbols sent during previous transmission blocks to be flushed and sets conditions necessary for cyclic repetition.

25. A network node, point or element according to claim 19, wherein the postfix creates the periodic extension of symbols in the data portion of the continuous phase modulation waveform.

26. A network node, point or element according to claim 19, wherein the module is configured to spread an arbitrary sequence of N/2 M-ary information symbols over N+G symbol intervals such that a continuous phase modulation transmitter can transmit a symmetric-periodically extended continuous phase modulation waveform without having to calculate any special "channels" symbols, where N denotes the length of the data portion of a continuous phase modulation block and G denotes the length of a cyclic extension.

27. A network node, point or element according to claim 19, wherein the module is configured to be used in uplink signaling applications when battery power is an important concern.

28. A computer program product with a program code, which program code is stored on a machine readable carrier, for carrying out a method comprising transmitting or receiving a block of symbols having data symbols and redundancy symbols, the redundancy symbols being generated based on the data symbols, a first part of the redundancy symbols being transmitted as a prefix of the block, a second part of the redundancy symbols being transmitted as a postfix of the block, a third part of the redundancy symbols being transmitted as an intermediate part of the block between the prefix part and postfix part, and the block forming part of a continuous phase modulation waveform that has a substantially symmetric period, when the computer program is run in a module of either a network node, point or element in a wireless network.

29. A method according to claim 1, wherein the method further comprises implementing the method via a computer program running in a processor, controller or other suitable module in one or more network nodes, points, terminals or elements in the wireless network.

30. A wireless network according to claim 10, wherein the wireless network is a Metropolitan Area Network including that set forth according to the IEEE 802.16e Specification, as well as some other suitable network based on one or more of the 3rd generation partnership project, global system for mobile communications, orthogonal frequency division multiplexing or code division multiple access network configurations.

31. A method according to claim 1, wherein the block forms part of the continuous phase modulation waveform that has a substantially symmetric period.

32. A method according to claim 1, wherein the first part of the redundancy symbols being generated from the symbols that are transmitted at the end of a data portion of the block, the second part of the redundancy symbols being generated from the symbols that are transmitted at the start of the data portion of the block, the third part of the redundancy symbols being generated from an entire sequence of non-redundant data symbols that are transmitted in the first half of the data portion of the block.

33. A wireless network according to claim 10, wherein the block forms part of the continuous phase modulation waveform that has a substantially symmetric period.

34. A wireless network according to claim 10, wherein the first part of the redundancy symbols being generated from the symbols that are transmitted at the end of a data portion of the block, the second part of the redundancy symbols being generated from the symbols that are transmitted at the start of the data portion of the block, the third part of the redundancy symbols being generated from an entire sequence of non-redundant data symbols that are transmitted in the first half of the data portion of the block.

35. A network node, point or element according to claim 19, wherein the block forms part of the continuous phase modulation waveform that has a substantially symmetric period.

36. A network node, point or element according to claim 19, wherein the first part of the redundancy symbols being generated from the symbols that are transmitted at the end of a data portion of the block, the second part of the redundancy symbols being generated from the symbols that are transmitted at the start of the data portion of the block, the third part of the redundancy symbols being generated from an entire sequence of non-redundant data symbols that are transmitted in the first half of the data portion of the block.

37. A method to receive a sequence of symbols being transmitted, comprising receiving a block of symbols having data symbols and redundancy symbols, where the redundancy symbols were generated based on the data symbols, a first part of the redundancy symbols being received as a prefix of the block, a second part of the redundancy symbols being received as a postfix of the block, a third part of the redundancy symbols being transmitted as an intermediate part of the block between the prefix part and postfix part, and the block forming part of a continuos phase modulation waveform that has a substantially symmetric period.

38. A method according to claim 37, wherein the block forms part of the continuous phase modulation waveform that has a substantially symmetric period.

39. A method according to claim 37, wherein the first part of the redundancy symbols being generated from the symbols that are transmitted at the end of a data portion of the block, the second part of the redundancy symbols being generated from the symbols that are transmitted at the start of the data portion of the block, the third part of the redundancy symbols being generated from an entire sequence of non-redundant data symbols that are transmitted in the first half of the data portion of the block.

40. A method according to claim 37, wherein the method includes equalizing a received symbol sequence using a discrete trigonometric transform equalizer.

41. A method according to claim 37, wherein the method includes choosing an equalization scheme adaptively in a receiver as a discrete trigonometric transform based or discrete Fourier transform based scheme.

42. A method according to claim 41, wherein the equalization scheme is chosen based on radio channel characteristics and/or signal quality determinations based on either real-time or feedback information.

43. A method according to claim 37, wherein each information symbol and its antipodal counterpart are received in a specific order within a data portion of the continuous phase modulation waveform.

44. A method according to claim 37, wherein the prefix allows the state memory of symbols sent during previous transmission blocks to be flushed and sets conditions necessary for cyclic repetition.

45. A method according to claim 37, wherein the postfix creates the periodic extension of symbols in the data portion of the continuous phase modulation waveform.

46. A method according to claim 37, wherein the method includes spreading an arbitrary sequence of N/2 M-ary information symbols over N+G symbol intervals such that a continuous phase modulation transmitter can transmit a symmetric-periodically extended continuous phase modulation waveform without having to calculate any special "channel" symbols, where N denotes the length of the data portion of a continuous phase modulation block and G denotes the length of a cyclic extension.

47. A method according to claim 37, wherein the method is used in uplink signaling applications when battery power is an important concern.

48. A node, point, terminal or device to receive a sequence of symbols being transmitted, comprising a module configured to receive a block of symbols having data symbols and redundancy symbols, where the redundancy symbols were generated based on the data symbols, a first part of the redundancy symbols being received as a prefix of the block, a second part of the redundancy symbols being received as a postfix of the block, a third part of the redundancy symbols being transmitted as an intermediate part of the block between the prefix part and postfix part, and the block forming part of a continuous phase modulation waveform that has a substantially symmetric period.

49. A node, point, terminal or device according to claim 48, wherein the block forms part of the continuous phase modulation waveform that has a substantially symmetric period.

50. A node, point, terminal or device according to claim 48, wherein the first part of the redundancy symbols being generated from the symbols that are transmitted at the end of a data portion of the block, the second part of the redundancy symbols being generated from the symbols that are transmitted at the start of the data portion of the block, the third part of the redundancy symbols being generated from an entire sequence of non-redundant data symbols that are transmitted in the first half of the data portion of the block.

51. A node, point, terminal or device according to claim 48, wherein the module equalizes a received symbol sequence using a discrete trigonometric transform equalizer.

52. A node, point, terminal or device according to claim 48, wherein the module chooses an equalization scheme adaptively as a discrete trigonometric transform based or discrete Fourier transform based scheme.

53. A node, point, terminal or device according to claim 52, wherein the equalization scheme is chosen based on radio channel characteristics and/or signal quality determinations based on either real-time or feedback information.

54. A node, point, terminal or device according to claim 48, wherein each information symbol and its antipodal counterpart are received in a specific order within a data portion of the continuous phase modulation waveform.

55. A node, point, terminal or device according to claim 48, wherein the prefix allows the state memory of symbols sent during previous transmission blocks to be flushed and sets conditions necessary for cyclic repetition.

56. A node, point, terminal or device according to claim 48, wherein the postfix creates the periodic extension of symbols in the data portion of the continuous phase modulation waveform.

57. A node, point, terminal or device according to claim 48, wherein an arbitrary sequence of N/2 M-ary information symbols are spread over N+G symbol intervals such that a continuous phase modulation transmitter can transmit a symmetric-periodically extended continuous phase modulation waveform without having to calculate any special "channel" symbols, where N denotes the length of the data portion of a continuous phase modulation block and G denotes the length of a cyclic extension.

58. A node, point, terminal or device according to claim 48, wherein the block forms part of uplink signaling applications when battery power is an important concern.

59. A method to cyclically extend a continuous phase modulation block, comprising:

transmitting each information symbol and its antipodal counterpart in a specific order within a data portion of the continuous phase modulation block; and adding first and second cyclic extensions to the continuous phase modulation block, and the continuous phase modulation block forming part of a continuous phase modulation waveform that has a substantially symmetric period.

60. A method according to claim 59, wherein the first cyclic extension is added as a prefix to the continuous phase modulation block and the second cyclic extension is added as a postfix to the continuous phase modulation block.

61. A method according to claim 59, wherein the first cyclic extension is generated from first symbols of the data portion of the continuous phase modulation block, and the second cyclic extension is generated from last symbols of the data portion of the continuous phase modulation block.

* * * * *